US008340197B2

United States Patent
Uhl et al.

(10) Patent No.: US 8,340,197 B2
(45) Date of Patent: Dec. 25, 2012

(54) SYSTEM AND METHOD FOR MODULATING A SIGNAL AT AN ANTENNA

(75) Inventors: Brecken H. Uhl, La Mesa, NM (US); Arthur D. Hurtado, Fairfax, VA (US); Daniel A. Law, Washington, DC (US)

(73) Assignee: Invertix Corporation, McLean, VA (US)

( * ) Notice: Subject to any disclaimer, the term of this patent is extended or adjusted under 35 U.S.C. 154(b) by 1052 days.

(21) Appl. No.: 12/277,901

(22) Filed: Nov. 25, 2008

(65) Prior Publication Data

US 2009/0220030 A1 Sep. 3, 2009

Related U.S. Application Data

(60) Provisional application No. 61/032,174, filed on Feb. 28, 2008, provisional application No. 61/115,729, filed on Nov. 18, 2008.

(51) Int. Cl.
*H04L 27/00* (2006.01)
(52) U.S. Cl. ............ 375/259; 375/297; 343/700 MS
(58) Field of Classification Search ........... 343/700 MS; 375/259, 295, 300, 302, 315, 268, 271
See application file for complete search history.

(56) References Cited

U.S. PATENT DOCUMENTS

| | | | |
|---|---|---|---|
| 5,048,116 A | 9/1991 | Schaeffer | |
| 5,486,836 A | 1/1996 | Kuffner | |
| 5,598,169 A | 1/1997 | Drabeck | |
| 5,825,329 A | 10/1998 | Veghte | |
| 6,061,025 A | 5/2000 | Jackson | |
| 6,175,723 B1 | 1/2001 | Rothwell, III | |
| 6,243,012 B1 | 6/2001 | Shober | |
| 6,434,372 B1 | 8/2002 | Neagley | |
| 6,950,629 B2 | 9/2005 | Nagy | |
| 7,129,892 B2 | 10/2006 | Borlez | |
| 7,194,284 B2 | 3/2007 | Rousu | |

(Continued)

FOREIGN PATENT DOCUMENTS

JP 10260251 9/1998

OTHER PUBLICATIONS

Keller, Steven D., et al., "Direct Modulation of an L-bank Microstrip Patch Antenna Using Integrated PIN Diodes," Sep. 20, 2006, 10 pages.

(Continued)

*Primary Examiner* — Jean B Corrielus
(74) *Attorney, Agent, or Firm* — The Marbury Law Group, PLLC

(57) ABSTRACT

A Direct Spatial Antenna Modulation (DSAM) antenna structure makes use of the instantaneous electromagnetic field state of a radiating antenna structure to achieve direct modulation of a transmitted signal within the antenna. In contrast to existing amplitude and phase-only based digital modulation techniques, this innovative technique utilizes an inherent spatial modulation component, mapping data spatially to different locations in the antenna structure, where each location has different transmitting and receiving properties. This spatial component of the modulation can enable, for example, a unique increase in data transmission speed in a fixed spectral bandwidth with no increase in bit error rate over current phase and amplitude only modulation techniques. Additionally, the DSAM antenna structure affords important benefits in reduced hardware complexity, reduced supply current consumption, and relaxed amplifier linearity requirements. This abstract is not to be considered limiting, since other embodiments may deviate from the features described in this Abstract.

15 Claims, 6 Drawing Sheets

U.S. PATENT DOCUMENTS

| | | |
|---|---|---|
| 7,298,228 B2 | 11/2007 | Stevenpiper |
| 7,436,370 B2 | 10/2008 | Blanton |
| 7,558,555 B2 | 7/2009 | Nagy |
| 8,073,392 B2 * | 12/2011 | Babakhani et al. .......... 455/63.4 |
| 2002/0128052 A1 | 9/2002 | Neagley |
| 2003/0114188 A1 | 6/2003 | Rousu |
| 2004/0214534 A1 | 10/2004 | Carlson |
| 2005/0025271 A1 * | 2/2005 | Molisch et al. ............... 375/347 |
| 2005/0179614 A1 | 8/2005 | Nagy |
| 2006/0281423 A1 * | 12/2006 | Caimi et al. .................. 455/129 |
| 2007/0222697 A1 * | 9/2007 | Caimi et al. .................. 343/861 |
| 2007/0286190 A1 | 12/2007 | Denzel |
| 2008/0111748 A1 * | 5/2008 | Dunn et al. ................... 343/702 |
| 2008/0143613 A1 | 6/2008 | Iwai |
| 2008/0188186 A1 * | 8/2008 | Hwang et al. .................. 455/69 |
| 2009/0219137 A1 | 9/2009 | Forster |
| 2012/0019420 A1 * | 1/2012 | Caimi et al. .................. 343/702 |

OTHER PUBLICATIONS

Keller, Steven D., "Introduction to Direct Modulation of a Symmetrical Half-Wavelength Patch Antenna Using Integrated Schottky Diodes," Jan. 23, 2006, Prepared for the Duke University Department of Electrical and Computer Engineering Ph.D. Qualifying Exam, 32 pages.

Ma, Guozhong, "Email Template," posted at http://postgrad.eee.bham.ac.uk/mag/Webinfor1.htm, Jun. 12, 2008.

* cited by examiner (Typical Radio Architecture)

(DSAM Radio Architecture)

SYSTEM AND METHOD FOR MODULATING A SIGNAL AT AN ANTENNA

CROSS REFERENCE TO RELATED APPLICATIONS

This application claims the benefit of Provisional Application No. 61/032,174 filed Feb. 28, 2008 and Provisional Application No. 61/115,729 filed Nov. 18, 2008. The 61/032,174 and the 61/115,729 applications are incorporated by reference herein, in their entireties, for all purposes.

BACKGROUND AND SUMMARY

In the disclosure that follows, the following acronyms may be used:

| | |
|---|---|
| AWGN | Additive White Gaussian Noise |
| BER | Bit Error Rate |
| BPSK | Binary Phase Shift Keying |
| CP | Circular Polarization |
| DCP | Dual Circular Polarized |
| DSAM | Direct Spatial Antenna Modulation |
| DSP | Digital Signal Processor |
| DSSS | Direct Sequence Spread Spectrum |
| EVM | Error Vector Magnitudes |
| GHz | Gigahertz |
| LAN | Local Area Network |
| LHCP | Left Hand Circular Polarized |
| LNA | Low Noise Amplifier |
| MHz | Megahertz |
| MSP | Microstrip Patch |
| PA | Power Amplifier |
| PCB | Printed Circuit Board |
| PEC | Perfect Electric Conductor |
| PIN | Positive Intrinsic Negative |
| PSD | Power Spectral Density |
| QPSK | Quadrature Phase Shift Keying |
| RF | Radio Frequency |
| RHCP | Right Hand Circular Polarized |
| SNR | Signal to Noise Ratio |
| STTR | Small Business Technology Transfer Program |

Modern society is increasingly dependent upon digital electronic communications. The electromagnetic spectrum is limited in nature, and hence the use of wireless radio-frequency electronic techniques to achieve the efficient transmission of digital communications is subject to ever increasing demand. There is a fundamental limitation to the number and rate of wireless transmissions that can be supported simultaneously in the finite electromagnetic spectrum. Any means to increase the data rate of a wireless digital transmission over a fixed-width frequency channel (fixed channel bandwidth) without affecting the quality of the transmission is thus highly desirable.

Existing bandwidth-efficient modulation formats make use of amplitude and phase-based techniques exclusively. That is, each data symbol to be transmitted exists as a different manipulation of the amplitude and phase state of the radio-frequency (RF) carrier signal, and the states are changed over time to communicate the data stream. The existing body of technical knowledge, documented in numerous works, is filled with a wide variety of examples that are familiar to one of ordinary skill in the art.

Very common examples of existing techniques are on-off keying (OOK), binary phase-shift keying (BPSK), and quadrature-phase shift keying (QPSK). The core dimensionality of these common temporal-only formats is two: either the amplitude or the relative phase, or both, of the carrier signal can be manipulated to form different symbols as a function of time. In OOK, the carrier is shifted between one of two amplitude levels to form a binary symbol set. In BPSK, the carrier phase is shifted between one of two values to form a binary symbol set. In QPSK, both the amplitude and phase of the carrier are manipulated to form a two-bit symbol set, such that each symbol sent over a given time period represents two bits of information.

Typically, higher order modulation formats are implemented by using more than just two amplitude and/or phase points in a digital transmission scheme. Examples are M-ary Phase shift keying (M-PSK) which is a phase modulation format, M-ary pulse amplitude modulation (M-PAM) which is an amplitude modulation format, and the M-ary quadrature amplitude modulation (M-QAM) format which uses both amplitude and phase together. In all cases, the "M" prefix relates the number of possible symbol states used. For example, 8-PSK would use 45 degrees of carrier phase difference between symbols (equal spacing) to generate a format with three bits per symbol. A 16-QAM format would encode four bits per symbol through the use of a combination of four amplitude states and four phase states.

QPSK represents the previously optimal four-level modulation format with respect to bandwidth efficiency. It is capable of the best bandwidth efficiency, often expressed as bits-per-second-per-Hertz, for a given transmit power and bit error probability. Although capable of packing more bits of information into a fixed bandwidth, all other high-order amplitude and phase based modulation formats suffer from increased error rates in their transmissions as "M" is increased with transmit power held constant.

When carrier amplitude and phase both have the potential to change in each symbol period during transmission, the linearity of the power amplifier used to transmit the signal becomes important in order to produce a non-distorted transmit signal. There is an upper limit to the maximum linear output power and supply efficiency at a given frequency of operation for the type of solid state power amplifier technology currently in use. It is a common requirement that amplifiers used to transmit high-order amplitude and phase modulated signals be "backed off" from their maximum operating output level in order to meet transmit signal distortion requirements, further reducing the maximum output power available to existing systems. These considerations of power amplifier linearity are obvious to anyone practiced in the art of wireless digital communication.

In the context of an electromagnetic radiator, polarization is defined as the instantaneous vector direction of the electric field of the propagating wave from the perspective of the transmit antenna. There are basically two types of polarization, linear and elliptical. In linear polarization, the electromagnetic wave propagating outward from the transmitting antenna exists (and varies in amplitude as a cosinusoid) along a single vector direction. For an elliptically polarized wave, the electric field vector rotates around the axis of propagation as a function of time, tracing out an ellipse as seen from behind. When both orthogonal components of an elliptical wave have the same peak amplitude, then the polarization is said to be circular.

The current paradigm in radio-frequency (RF) electronic communications is heavily weighted toward the utilization of time-based modulation. Each symbol to be transmitted is encoded by expressing a particular amplitude and phase state of the transmitted signal for a particular segment of time, after which a new symbol is expressed, and so on. The current paradigm is of course very effective and highly developed, but nonetheless totally ignores an entire dimension of modulation: space. The spatial modulation dimension ignored in current techniques is exactly that which enables the significant advantages of the present innovation.

Additionally, the prevalent paradigm in RF electronic communications also treats 1) the RF modulating element and 2) the RF antenna as totally separate and distinct system elements. As such, each is designed and defined independently according to "black box" level specifications and connected together in a functionally modular fashion, wherein the baseband data message signal interacts with the RF carrier in the RF modulating element to form a composite signal wholly independent of the characteristics of the RF antenna. The composite modulated RF carrier signal is then provided as a generic input to the RF antenna. This situation is illustrated in FIG. 1A, and represents essentially all existing applications of art.

There are several important aspects of existing approaches to modulation that rely on the architecture illustrated in FIG. 1A. First, the modulator stage is a lossy system component, wherein some of the RF carrier signal power is used up in the modulation process. This loss must be overcome through additional re-amplification of the output of the core modulating element, a function that is often, but not always, included internal to the integrated circuit or sub-system comprising the modulator. The amplification needed to overcome the losses associated with existing modulation techniques requires additional system power supply consumption.

Secondly, the existing architecture class of FIG. 1A requires that the final amplification stage process the composite modulated signal directly as it amplifies the composite signal up to the desired transmit power level prior to being fed to the RF antenna. Linearity performance requirements are thereby imposed on the final power amplification (PA) stage such that a failure to meet the linearity requirements will result in an inability to achieve some desired level of transmit modulation accuracy and thus wireless communications link performance.

A class of technologies utilizes the antenna to modulate a carrier and is sometimes described as using "direct antenna modulation" techniques. These methods tend to focus on amplitude modulation only, and they do not leverage the spatial aspects of the antennas. Other current research efforts that use the term "antenna modulation" do not encode information symbols on a transmitted signal, but are rather attempts to achieve an increase in the equivalent instantaneous impedance bandwidth of an antenna, which is otherwise used in a traditional fashion. In both cases, the antenna is "conditioned" to send data, but the data do not control how the antenna operates.

What would be useful is a modulation and demodulation scheme that achieves an improved data rate at a lower cost and that leverages the spatial aspects of an antenna.

DETAILED DESCRIPTION

In an embodiment, the typically distinct RF modulator and RF antenna functions are combined into a Direct Spatial Antenna Modulation (DSAM) antenna structure defined through adherence to a specific conceptual rubric, to be described. The net result of this combination is that the modulation functionality is moved into the antenna structure itself, eliminating the typical modulation stage in existing approaches.

Figure 1A:
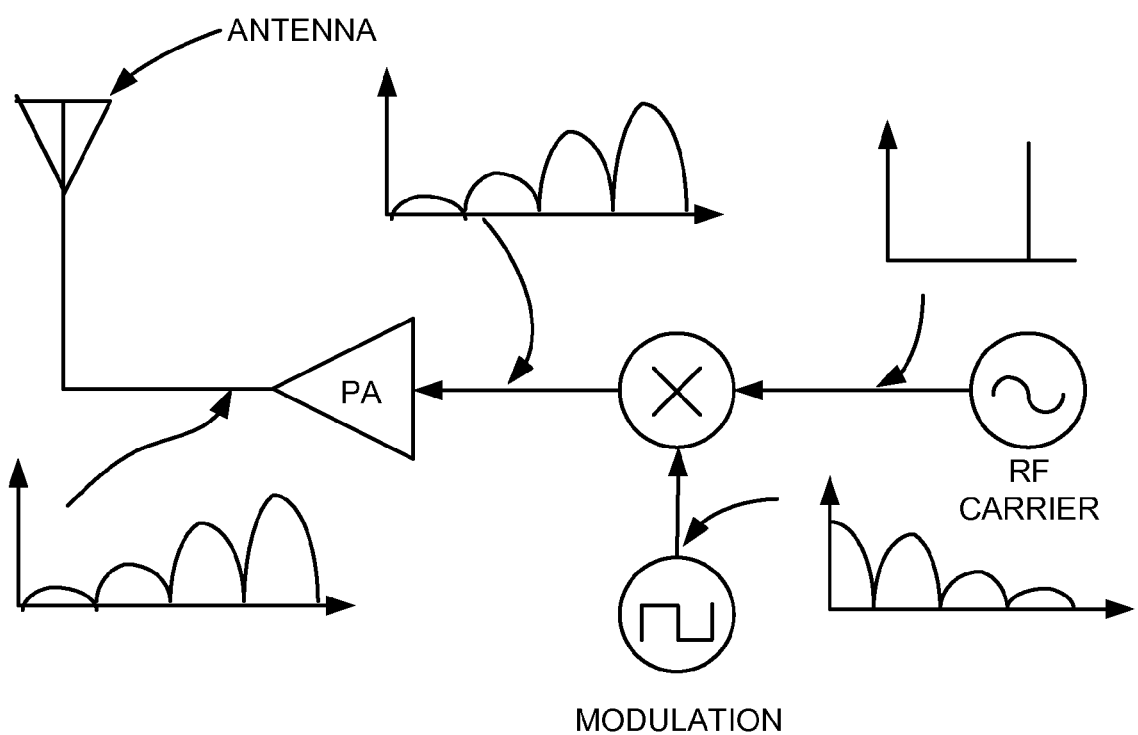
FIG. 1A is a block diagram illustrating the logical components of a modulation scheme as known in the prior art.
Figure 1B:
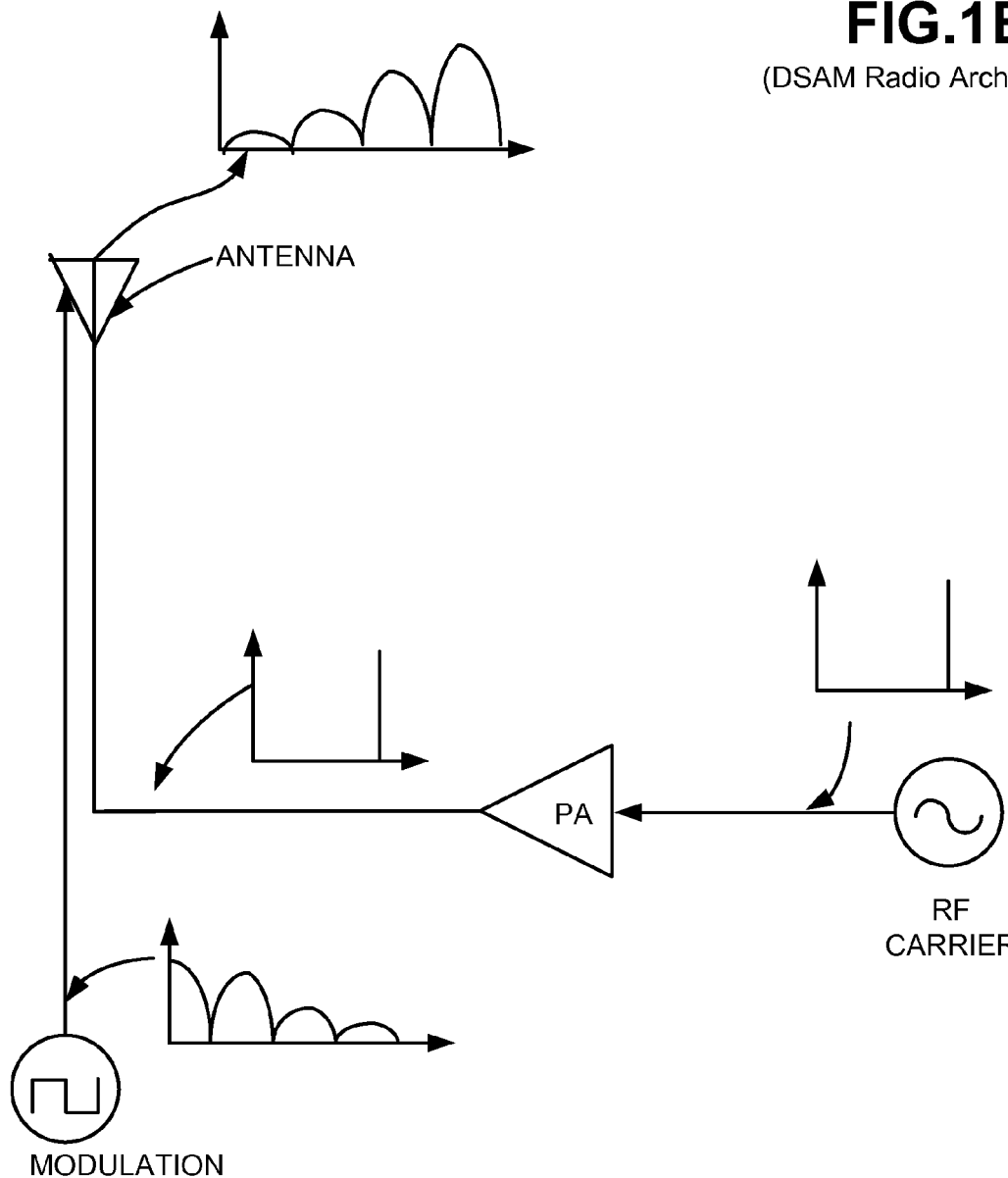
FIG. 1B is a block diagram illustrating the logical components of a modulation scheme according to an embodiment hereof.

FIG. 1B is a block diagram illustrating the logical components of a modulation scheme according to an embodiment hereof. As illustrated in FIG. 1B, the pre-PA lossy modulator structure required in existing approaches (see, FIG. 1B) has been eliminated in the DSAM architecture. Not only does DSAM architecture overcome the system power losses associated with the typical modulator stage, but it potentially offers a lower-cost and reduced-size implementation of the same functionality. By moving the composite modulated signal to after the final PA stage, the PA need only process the bare RF carrier signal itself for which there are drastically reduced linearity requirements relative to the composite modulated signal. Reduced linearity requirements allow for increased transmit power with a given amplifier device or possible utilization of a less expensive, less power consumptive, and physically smaller alternate power amplifier.

In DSAM, message signal modulation is performed as a primary activity in a composite antenna implementation through direct manipulation of the instantaneous state of the polarization of the radiating structure electromagnetic excitation. As such, the composite modulated waveform signal does not necessarily appear as a discrete entity within the antenna structure itself. The bare, unmodulated RF carrier excites the resonant nature of the electromagnetic structure while the baseband data message signal directly controls the instantaneous spatial point of origination of the RF carrier excitation within the structure. As such, the DSAM concept can be described as a "spatio-temporal" modulation technique since it breaks away from existing time-only modulation techniques to utilize direct spatial excitation control.

In an embodiment, a direct spatial antenna modulation (DSAM) antenna includes a radiating structure comprising spatial points of origination, a common feed point for receiving a carrier signal that is unmodulated, and a switching system responsive to a baseband data signal, wherein the switching system directs the unmodulated carrier signal to at least one spatial point of origination thereby modulating the carrier signal.

The spatial aspects of antenna structure excitation are emphasized in DSAM. The RF carrier excitation is of a totally continuous wave (CW) nature. The differences between conventional pre-antenna modulation and DSAM are best illustrated by a short look at fundamental mathematical representations of the electric field in each case. For this work, the convention of:

$$\bar{\epsilon}(t) = Re\{\bar{E}e^{i\omega t}\} \qquad (1)$$

is used, where the explicitly time-varying far-zone instantaneous electric field is $\bar{\epsilon}(t)$, the time-harmonic electric field is $\bar{E}$, and the time-harmonic carrier frequency is $\omega$.

To continue the illustration, the typical approach of treating the magnetic ($\bar{A}$) and electric ($\bar{F}$) vector potential of the antenna structure in order to determine the radiated electric ($\bar{E}$) or magnetic ($\bar{H}$) fields at distances far from the antenna is used. This approach applies to both conventional modulation and DSAM. The electric and magnetic fields of an antenna in this approach are determined as:

$$\bar{E} \cong -j\omega \bar{A} \quad (2)$$

where $$\bar{A} = \mu \iiint_V \bar{J} G(r,r') dV' \quad (3)$$

and $$\bar{H} \cong -j\omega \bar{F} \quad (4)$$

where $$\bar{F} = \epsilon \iiint_V \bar{M} G(r,r') dV' \quad (5)$$

and where G(r, r') is the well-known free-space Green function in three dimensions, $\bar{J}$ and $\bar{M}$ are the electric and magnetic (conceptual) source current distributions, respectively. The integrations in (3) and (5) are performed over the "primed" source volume coordinates and then evaluated at the "unprimed" field coordinates.

For conventional modulation, the complex source excitation factor, $s_n$, is given as:

$$s_n = \alpha_n e^{j\Theta_n} \quad (6)$$

which represents a modulated information signal in the typical communication sense. In (6), $\alpha_n$ is the data symbol amplitude function, $e^{j\Theta_n}$ is the data symbol phase function, and each is expressed here as a constant value over the duration of the $n^{th}$ information symbol period, T. Equation (6) implies that a rectangular pulse function is in use. In the conventional modulation approach, all modulation of the out-going wave takes place in terms of the time-varying excitation signal being presented to the fixed input terminals of the antenna.

With conventional modulation, the electric source current can be expressed as $$\bar{J}_n^{CONV} = \alpha_n e^{j\Theta_n} \bar{J} \quad (7)$$

where the modulated signal $s_n$ is applied to a primary antenna excitation current $\bar{J}$ that is constant for all n=1, 2 ... N different possible information symbol states.

Breaking the conventional modulation approach down term by term reveals the implied distinction between the modulated signal $\alpha_n e^{j\Theta_n}$ and the basic antenna structure electromagnetic field response $\bar{E}$ when defining the total radiated field, $\bar{E}_n^{CONV}$:

$$\bar{E}_n^{CONV} = \alpha_n e^{j\Theta_n} \bar{E} \quad (8)$$

In (8), the carrier term $e^{j\omega t}$ has been suppressed as is typical, and the same approach can be taken to determine the magnetic field $\bar{H}_n^{CONV}$ for conventional modulation.

In conventional modulation, the excitation of the MSP is fixed (does not change) across information symbols during a transmission. Rather, the information is a time-varying signal imposed as a multiplication of the underlying antenna response as given in (8). In (8), the amplitude, phase, or both, of the information signal change in each $n^{th}$ information symbol transmission.

In stark contrast, DSAM makes exclusive use of the spatial aspects of the antenna response itself, ignoring the method of typical modulation. In DSAM, each symbol is mapped directly to the electromagnetic field produced by the antenna structure itself by way of controlling where the excitation is present in each $n^{th}$ information symbol period. This spatial difference in excitation using a constant amplitude, constant phase source is defined:

$$\bar{J}_n^{DSAM} = \bar{J}_n \quad (9)$$

where each $n^{th}$ DSAM information symbol excitation $\bar{J}_n^{DSAM}$ is implemented through a re-location of a constant $\bar{J}$. The vector nature of the constant excitation results in the modulated symbol differences between each $\bar{J}_n$ achieved by DSAM.

The total radiated field for DSAM, $\bar{E}_n^{DSAM}$, is therefore defined as:

$$\bar{E}_n^{DSAM} = \bar{E}_n \quad (10)$$

where each DSAM symbol state is expressed through a different spatially-derived field state.

The added modulation dimension of space to that of the in-phase and quadrature carrier time manipulation of existing techniques allows for the DSAM concept to cover a highly spectrally efficient modulation format. The DSAM concept is inherently suited to direct incorporation of an additional bit of information within the same occupied spectrum as that which would be produced by the time-only modulation format optimum. All other factors being equal, the time-only modulation format optimum is QPSK, wherein the in-phase and quadrature content of the RF carrier are both manipulated independently to form a signal with two information bits per transmitted symbol state. The optimality of conventional QPSK modulation is that the format theoretically produces a two-bit symbol in a fixed transmitted spectral occupancy (channel) at a given error probability without an increase in transmit power. Further, to transmit additional bits within a given symbol period, all other time-only modulation formats require either additional spectrum or additional transmit power to achieve the same theoretical received bit error probability as a DSAM.

In an embodiment, a DSAM architecture is utilized to form a dual-circular-polarized (DCP) DSAM antenna. In DCP-DSAM, an additional information bit is mapped to the circular polarization state of the already-polarized modulated DSAM signal, thereby achieving a 50% data rate increase within the same occupied spectral channel. The uncorrelated nature of the relative circular sense of the transmitted wave relative to the instantaneous absolute carrier phase value is such that the error rate of the DCP-DSAM format scales with this new bit, resulting in the same net per-bit error rate.

Figure 2:
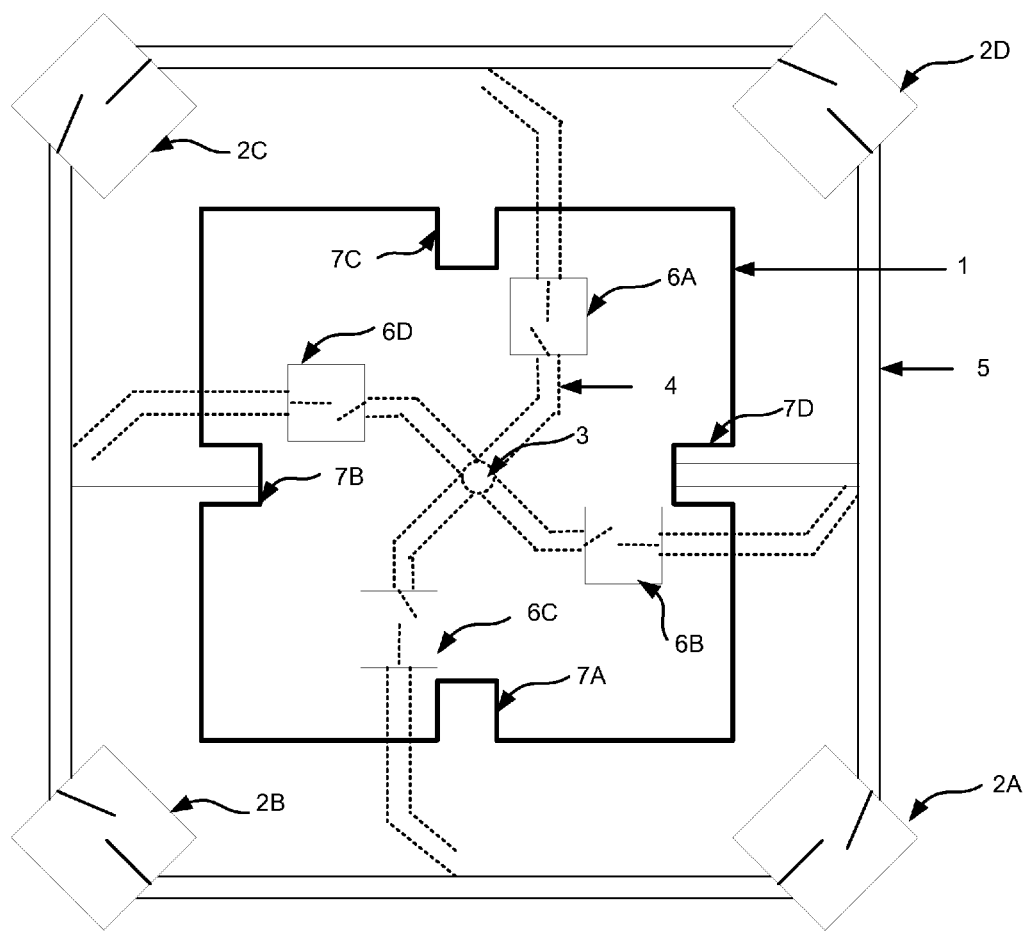
FIG. 2 illustrates a block diagram of a modulated antenna structure implemented according to an embodiment hereof.

FIG. 2 illustrates a block diagram of a modulated antenna structure implemented according to an embodiment hereof. The embodiment illustrated in FIG. 2 comprises a microstrip patch antenna structure (1), a radio-frequency switch system comprising switches 2A, 2B, 2C, 2D and 6A, 6B, 6C and 6D, a common feed point location (3), multiple bottom layer printed circuit transmission line sections (4), and multiple top layer printed circuit transmission line sections (5). In this embodiment, the microstrip patch antenna structure (1) is a square layer of copper of dimensions appropriate to the operating frequency and printed circuit board substrate material. However, this is not meant as a limitation. Other materials of appropriate size and shape may be used to perform the functions of the microstrip patch antenna. For example, a suitable alternative radiating element to the microstrip patch would be a quadrifilar helix, a waveguide horn, or even a pair of crossed dipoles. The choice of antenna structure in a typical application would be based on the overall requirements of the application, such as radiation pattern coverage, available physical volume, and so on.

The microstrip patch antenna structure (1), along with all top-layer switches (2A-2D) and transmission lines (5), sit above a metalized ground layer, separated by a dielectric circuit board material, as required for their proper operation. The bottom layer transmission lines (4) and switches (6A-6D) sit below the same metalized ground layer, separated by another dielectric circuit board material layer. The specific dielectric used, dielectric and metallization thicknesses and similar typical design details are not critical in principle to the operation of the illustrated embodiment.

In an embodiment, the lengths of the top and bottom layer transmission line segments and the placement of the switch elements in FIG. 2 are configured so as to provide an odd multiple of ¼ guided wavelength electrical delay over the desired operating band of the device with respect to the common feed location (3), driven antenna ports, and adjacent switch device locations. As such, the opening and closing of the switches 2A-2D and 6A-6D are used to control the routing and relative delay of the radio frequency continuous carrier signal presented to the feed ports of the antenna structure (7A-D). The means to achieve the phase shift of the carrier arriving at the antenna ports can be implemented in a wide variety of ways. All typical options for achieving a phase shift of the bare carrier would be suitable, such as a passive microwave hybrid device or an active circuit such as a loaded line, so long as the phase shift is used solely as a means to properly excite spatially separated antenna ports as opposed to being the point of modulation in and of themselves. While FIG. 2 illustrates an antenna structure with four feed ports, this is not meant as a limitation.

As illustrated in FIG. 2, the radio frequency carrier alone serves as the excitation of the antenna structure. The baseband data symbol signals serve only to control the time-space excitation of the antenna structure by the continuous wave carrier.

To modulate a carrier, a DSAM antenna switches a carrier feed to different spatial points in a DSAM antenna structure, where each point (or collection of points) has a particular far-field propagation characteristic. The number of symbol states, or bits, transmitted per modulating cycle is related to the number of injection point configurations available. The symbol rate is determined by the switching rate of the DSAM circuitry.

By way of illustration and not as a limitation, an unmodulated carrier is presented in all cases to common feed location 3. If dual-linear polarized quadrature phase shift keying (QPSK) modulation is desired, then all switches would remain open during operation of the embodiment except for any one at a given time of the set: { 6A, 6B, 6C, and 6D}. This set of closed switch positions produces one of four distinct spatial modulation responses corresponding to four distinct data symbol states.

Alternately, for the case of a single-sense circular-polarization with the same QPSK format, paired sets of closed switch settings are required for each of the four symbol states. The switch sets in this case would be: {(6A, 2C), (6D, 2B), (6C, 2A), (6B, 2D)}, in which case right-hand-circular polarization would result. If instead left-hand circular polarization was desired, then a different set of four switch combinations would be required: {(6A, 2D), (6D, 2C), (6C, 2B), (6B, 2A)}. The right-hand and left-hand symbol states can be combined to produce a new modulation format: dual-circular-polarized (DCP) QPSK DSAM which has a total of eight symbol states.

The maximum data switching rate of a DSAM structure is related to the maximum transition rate of the switching element and to the dynamics of the electromagnetic radiating structure (antenna) itself, whichever is more influential. The support dynamics of the antenna are determined by the specific antenna structure chosen from among all possible DSAM-capable designs and in general will be the least dominant relative to the actual switching mechanism itself since the antenna already supports operation at the radio frequency (RF) carrier signal, which will typically be faster than the data symbol rate.

In an embodiment, the data symbol switching is performed by a PIN RF diode. PIN diode forward-bias (turn on) and reverse bias (turn off) times are different. The forward bias of a PIN diode happens very quickly, with only a minor degree of dependence on bias current. Typical values are in the 2-10 ns range. Once forward-biased, achieving a reverse-bias state is a more complicated function of device characteristics and forward bias current conditions. With sufficient reverse bias, however, these times can be made very nearly equal, yielding a switching rate on the order of 500 MHz. By way of example and not as a limitation, at 3 bits per symbol, as is the case in DCP-QPSK DSAM, a bit rate of 1.5 Gbps may be achievable.

Mapping of baseband data symbols to the antenna space-time structure excitation results in the ability to implement full phase control over the transmitted wave time state, with wave state polarization capabilities as an additional aspect of control. This level of control allows for the implementation of the DCP-DSAM modulation format using circular polarization sense as an additional orthogonal bit state on top of the already optimal QPSK format afforded by the use of four spatial feed points as previously described.

Figure 3A:
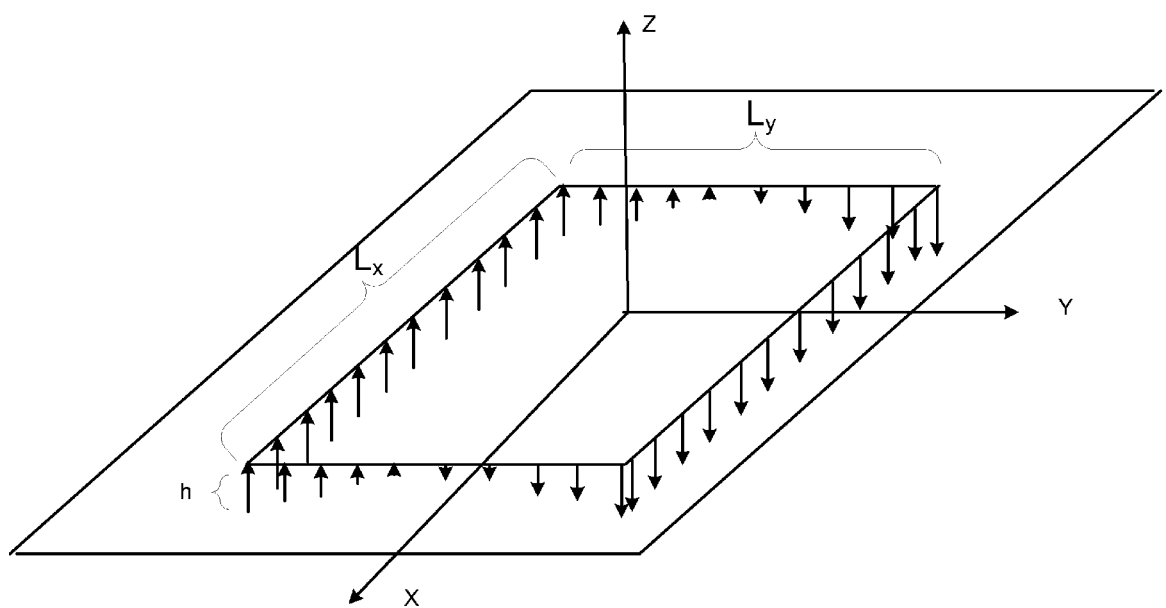
FIGS. 3A and 3B illustrate fields produced by a DSAM antenna according to embodiments hereof.
Figure 3B:
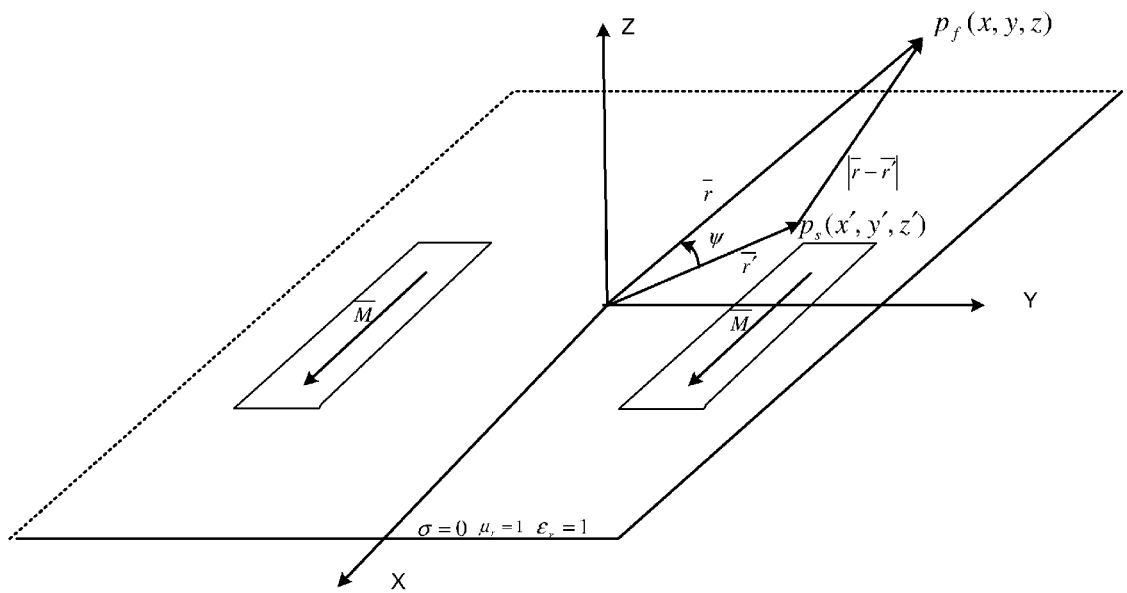
Figure 4:
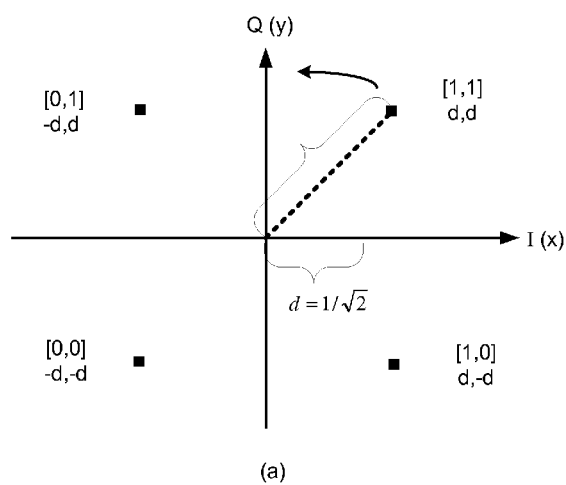
FIG. 4 illustrates QPSK constellations according to embodiments.
Figure 4:
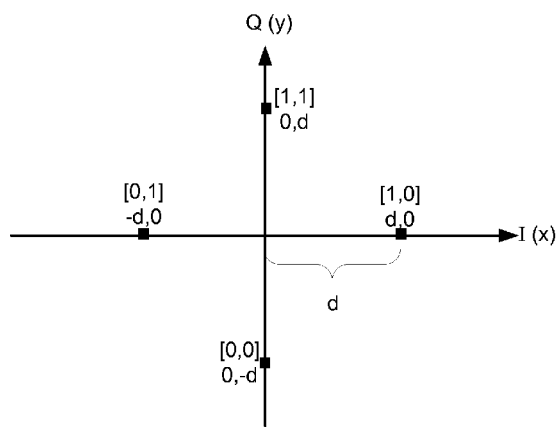

The fields produced by the DSAM microstrip patch antenna (MSP) can be calculated using the standard model and approximations as shown in FIGS. 3A and 3B. The diagrams in FIGS. 3A and 3B are used to convert the physical model illustrated in FIG. 3A to the equivalent mathematical model illustrated in FIG. 3B, where the fields produced by the MSP are determined using the equivalent aperture magnetic currents (M) produced based on which of the four available excitation ports are connected to the carrier source. A vector-potential based formulation is then used to develop the fields produced by the DSAM MSP in each possible excitation state.

The fields produced by the MSP providing for the possibility of exciting any of the four edges (located at +Y, −Y, −X, and +X in the coordinate system of FIG. 3) are given below as (11) through (18). Excitation in each aperture of the MSP produce, in general, both θ and φ directed electric field components in the far-zone.

Excitation along +Y produces an electric field:

$$E_\theta^{+Y} = -jk_0 V_0 L_Y \frac{e^{-jk_0 r}}{4\pi r} P_{E_\theta^{+Y}} \tag{11}$$

where the pattern factor is:

$$P_{E_\theta^{+Y}} = \mathrm{sinc}\left(\frac{k_0 L_y}{2}\sin(\theta)\sin(\phi)\right) \times \\ \cos\left(\frac{k_0 L_x}{2}\sin(\theta)\cos(\phi)\right) \times \left(\frac{1+\cos(\theta)}{2}\right)\cos(\phi) \tag{12}$$

and $$E_\phi^{+Y} = jk_0 V_0 L_Y \frac{e^{-jk_0 r}}{4\pi r} P_{E_\phi^{+Y}} \tag{13}$$

where the pattern factor is:

$$P_{E_\phi^{+Y}} = \operatorname{sinc}\left(\frac{k_0 L_y}{2}\sin(\theta)\sin(\phi)\right) \times \cos\left(\frac{k_0 L_x}{2}\sin(\theta)\cos(\phi)\right) \times \left(\frac{1+\cos(\theta)}{2}\right)\sin(\phi) \quad (14)$$

Excitation along −X produces an electric field:

$$E_\theta^{-X} = jk_0 V_0 L_X \frac{e^{-jk_0 r}}{4\pi r} P_{E_\theta^{-X}} \quad (15)$$

where the pattern factor is:

$$P_{E_\theta^{-X}} = \operatorname{sinc}\left(\frac{k_0 L_x}{2}\sin(\theta)\cos(\phi)\right) \times \cos\left(\frac{k_0 L_y}{2}\sin(\theta)\sin(\phi)\right) \times \left(\frac{1+\cos(\theta)}{2}\right)\sin(\phi) \quad (16)$$

and $$E_\phi^{-X} = jk_0 V_0 L_X \frac{e^{-jk_0 r}}{4\pi r} P_{E_\phi^{-X}} \quad (17)$$

where the pattern factor is:

$$P_{E_\phi^{-X}} = \operatorname{sinc}\left(\frac{k_0 L_x}{2}\sin(\theta)\cos(\phi)\right) \times \cos\left(\frac{k_0 L_y}{2}\sin(\theta)\sin(\phi)\right) \times \left(\frac{1+\cos(\theta)}{2}\right)\cos(\phi) \quad (18)$$

In Equations (11) through (18) and throughout this description, constants and parameters have the typical units and meanings, and a good standard for their definition in the field is the text "Advanced Engineering Electromagnetics" by Constantine A. Balanis. The −Y and +X fields produced are just the negative of the +Y and −X fields, respectively, and restricting the mathematical values of excitation to $I^Y=+/-\{0, 1, j\}$ and $I^{-X}=+/-\{0, 1, j\}$ results in the total MSP field expression given as:

$$\bar{E}_{MSP}(\theta, \phi) = \hat{\theta}(I^{+Y}E_\theta^{+Y}(\theta,\phi) + I^{-X}E_\theta^{-X}(\theta,\phi)) + \hat{\phi}(I^{+Y}E_\phi^{+Y}(\theta,\phi) + I^{-X}E_\phi^{-X}(\theta,\phi)) \quad (19)$$

As long as the excitation values in Equation (19) are derived spatially, then the modulation is considered DSAM. The conceptual complex or negative values of excitation required per the mathematical description of (19) meet this requirement in the case of the MSP antenna described here.

Using the field expression for the MSP just derived and presented as Equation (19), conventional modulation used with a QPSK modulation format can be defined as:

$$\bar{E}_n^{C-QPSK}(0,0) = \hat{x}(-j)e^{j\Theta_n}K \quad (20)$$

where the pattern is taken along the boresight ($\theta=0$, $\phi=0$) and the fixed antenna excitation uses $\{I+Y=1, I-X=0\}$ to achieve linear vertical polarization. The electric field factor, $K$, is defined as:

$$K = k_0 L \frac{e^{-jk_0 r}}{4\pi r} \quad (21)$$

For DSAM, a possible expression of QPSK with the MSP antenna, again along the boresight, can take the form of:

$$\bar{E}_n^{D-QPSK}(0,0) = \hat{x}(-j)I_n^{+Y}K - \hat{y}(j)I_n^{-X}K \quad (22)$$

where it is seen that both the vertical and horizontal components of the antenna polarization are in this case required to achieve QPSK modulation.

The mapping used to produce QPSK in both the conventional approach ($a_n=1$) and in the case of DSAM modulation is given below in Tables 1(a)-(c). Table 1(a) depicts the excitation for both a conventional transmitter and a DSAM transmitter for the case of linearly-polarized QPSK. Table 1(b) depicts the excitation for both a conventional transmitter and DSAM QPSK transmitter for the case of RHCP polarization. Table 1(c) depicts the four basic receiver polarization response vector components describing vertical, horizontal, LHCP, and RHCP polarization state possibilities. In Tables 1(a)-(c), $\{I, Q\}$ represent the information bits, with $\Theta_n$ the corresponding required excitation in the conventional approach of (20), while $I_n^Y$ and $I_n^{-X}$ are the excitation required for the new DSAM approach in (22).

TABLES 1(a), 1(b) and 1(c)

(a)

| I | Q | $\Theta_n$ | $I_n^Y$ | $I_n^{-X}$ |
|---|---|---|---|---|
| 0 | 0 | $-\frac{\pi}{2}$ | 0 | −1 |
| 0 | 1 | $\pi$ | −1 | 0 |
| 1 | 0 | 0 | 1 | 0 |
| 1 | 1 | $\frac{\pi}{2}$ | 0 | 1 |

(b)

| I | Q | $\Theta_n$ | $I_n^Y$ | $I_n^{-X}$ |
|---|---|---|---|---|
| 0 | 0 | $-\frac{\pi}{2}$ | −j | −1 |
| 0 | 1 | $\pi$ | −1 | j |
| 1 | 0 | 0 | 1 | −j |
| 1 | 1 | $\frac{\pi}{2}$ | −j | 1 |

(c)

| Polarization | p+Y | p−X |
|---|---|---|
| Vertical ($\hat{x}$) | 1 | 0 |
| Horizontal ($\hat{y}$) | 0 | 1 |
| Right-Hand Circular | $\frac{1}{\sqrt{2}}$ | $\frac{-j}{\sqrt{2}}$ |
| Left-Hand Circular | $\frac{1}{\sqrt{2}}$ | $\frac{j}{\sqrt{2}}$ |

For RHCP polarization, the conventional transmitter requires a different fixed antenna excitation, resulting in a different structural electric field response, leading to:

$$\overline{E}_n^{C\_QPSK\_RHCP}(0,0) = \frac{K}{\sqrt{2}}(\hat{x}(-j) + \hat{y}(j)(-j))e^{j\Theta_n} \quad (23)$$

To maintain equal-energy symbol states, the DSAM field response for the case of RHCP polarization is also defined as:

$$\overline{E}_n^{D\_QPSK\_RHCP}(0,0) = \frac{K}{\sqrt{2}}(\hat{x}(-j)I_n^{+Y} + \hat{y}(j)I_n^{-X}) \quad (24)$$

The receiver polarization response vector (p) is used to determine the net response of an in-coming transmitted signal at the receiver for both magnitude (25) and phase (26) portions of the response.

$$E_{RX}^M(\Theta,\phi) = |\overline{E}(\Theta,\phi) \cdot \overline{p}^*(\Theta,\phi)| \quad (25)$$

$$E_{RX}^P(\Theta,\phi) = \text{Arg}(\overline{E}(\Theta,\phi) \cdot \overline{p}^*(\Theta,\phi)) \quad (26)$$

where the "*" in Equations (25) and (26) represents the complex-conjugate operator.

Table 2 depicts the response at the receiver for different receive polarization types along the boresight of the main beam of the MSP field pattern when linear-polarized transmission is used. As shown, DSAM produces different responses depending on the characteristics of the receiver polarization and the effect that may be applied to achieve rejection of a transmitted signal by non-compatible receivers.

TABLE 2

Receiver Real and Imaginary Signal Components Based on Receiver Polarization State, Linear Transmit Polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| Vertical ($\hat{x}$) Receive | | | | | |
| 0 | 0 | 1 | $-\frac{\pi}{2}$ | 0 | und. |
| 0 | 1 | 1 | $\pi$ | 1 | $\pi$ |
| 1 | 0 | 1 | 0 | 1 | 0 |
| 1 | 1 | 1 | $\frac{\pi}{2}$ | 0 | und. |
| Horizontal ($\hat{y}$) Receive | | | | | |
| 0 | 0 | 0 | und. | 1 | $\pi$ |
| 0 | 1 | 0 | und. | 0 | und. |
| 1 | 0 | 0 | und. | 0 | und. |
| 1 | 1 | 0 | und. | 1 | 0 |
| RHCP Receive | | | | | |
| 0 | 0 | 0.707 | $-\frac{\pi}{2}$ | 0.707 | $-\frac{\pi}{2}$ |
| 0 | 1 | 0.707 | $\pi$ | 0.707 | $\pi$ |
| 1 | 0 | 0.707 | 0 | 0.707 | 0 |
| 1 | 1 | 0.707 | $\frac{\pi}{2}$ | 0.707 | $\frac{\pi}{2}$ |
| LHCP Receive | | | | | |
| 0 | 0 | 0.707 | $-\frac{\pi}{2}$ | 0.707 | $\frac{\pi}{2}$ |
| 0 | 1 | 0.707 | $\pi$ | 0.707 | $\pi$ |

TABLE 2-continued

Receiver Real and Imaginary Signal Components Based on Receiver Polarization State, Linear Transmit Polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| 1 | 0 | 0.707 | 0 | 0.707 | 0 |
| 1 | 1 | 0.707 | $\frac{\pi}{2}$ | 0.707 | $-\frac{\pi}{2}$ |

In Table 2, it is clear that DSAM can be used to both exactly reproduce the net effect of a typical QPSK transmission and also to achieve different results as well, depending on the polarization of the receive antenna. Due to the large number of possibilities with respect to transmitted polarization state, not all possible combinations are shown here. The next example illustrates identical results for conventional modulation and DSAM.

The results of Table 3 provides the net response at a receive antenna of different polarization types for the case of RHCP modulation per Equations (23) and (24). In this case, both conventional modulation and DSAM produce equivalent results.

TABLE 3

Receiver Real and Imaginary Signal Components Based on Receiver Polarization State, RHCP Transmit polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| Vertical ($\hat{x}$) Receive | | | | | |
| 0 | 0 | 0.707 | $-\frac{\pi}{2}$ | 0.707 | $-\frac{\pi}{2}$ |
| 0 | 1 | 0.707 | $\pi$ | 0.707 | $\pi$ |
| 1 | 0 | 0.707 | 0 | 0.707 | 0 |
| 1 | 1 | 0.707 | $\frac{\pi}{2}$ | 0.707 | $\frac{\pi}{2}$ |
| Horizontal ($\hat{y}$) Receive | | | | | |
| 0 | 0 | 0.707 | $\pi$ | 0.707 | $\pi$ |
| 0 | 1 | 0.707 | $\frac{\pi}{2}$ | 0.707 | $\frac{\pi}{2}$ |
| 1 | 0 | 0.707 | $-\frac{\pi}{2}$ | 0.707 | $-\frac{\pi}{2}$ |
| 1 | 1 | 0.707 | 0 | 0.707 | 0 |
| RHCP Receive | | | | | |
| 0 | 0 | 1 | $-\frac{\pi}{2}$ | 1 | $-\frac{\pi}{2}$ |
| 0 | 1 | 1 | $\pi$ | 1 | $\pi$ |
| 1 | 0 | 1 | 0 | 1 | 0 |
| 1 | 1 | 1 | $\frac{\pi}{2}$ | 1 | $\frac{\pi}{2}$ |
| LHCP Receive | | | | | |
| 0 | 0 | 0 | und. | 0 | und. |
| 0 | 1 | 0 | und. | 0 | und. |
| 1 | 0 | 0 | und. | 0 | und. |
| 1 | 1 | 0 | und. | 0 | und. |

Different transmit polarization states produce different responses at the receiver, and indeed this is the basis for the highly-efficient DCP-DSAM modulation format that uses both RHCP and LHCP states to add an extra bit per symbol to the data stream relative to fixed-polarization QPSK.

DSAM itself is not limited to producing only the QPSK modulation format. Rather, a wide variety of modulation, some not otherwise achievable using the existing techniques represented in Equation (19) alone, can be produced by DSAM. For example, BPSK is a degenerate case of the specific QPSK mapping about to be described, and extensions to 8-PSK are immediately possible. To achieve modulation formats such as m-ary quadrature amplitude modulation (M-QAM) and maintain full compliance with the core DSAM concept, a spatial aspect of the modulation imparts different amplitude and phase characteristics of each information symbol. Furthermore, the dual circular-polarized QPSK (DCP-QPSK) DSAM mapping to be described goes beyond current application in the specifics of its implementation and provides improved characteristics relative to existing approaches.

DSAM Applied to Other Antenna Structures

The DCP-QPSK format enabled by the DSAM approach to data symbol modulation can provide the unique benefit of an unfiltered 3 bits/sec/Hz at the same bit error rate (BER) as the previously-optimum typical modulation approach to QPSK, which produces 2 bits/sec/Hz. While this major benefit is clearly defined in terms of the MSP antenna structure defined earlier in this document using a rigorous closed-form approach, the MSP antenna may not be the most advantageous structure to which DSAM may be applied in this case.

The general class of antennas referred to as resonant, fractional-turn, quadrifilar helix (QFH) antennas has many desirable properties with respect to producing DCP-DSAM over a large spatial extent. Of course, the choice of an antenna structure is a tradeoff and the best choice for a given application may vary, but this presents no problem for DSAM, which can be applied to any new or existing antenna structure. Nevertheless, the specific properties of the QFH with respect to DSAM in a CP mode, and most particularly to DCP-DSAM, are expected to be particularly relevant to many applications requiring an omni-directional field pattern.

When using a QFH antenna, the choice of specific number of element turns, element length, element spacing and so on is a matter of the more detailed and typical design choices to be made for a particular implementation. By way of illustration and not as a limitation, a single-wound QFH and a contra-wound QFH may be used to implement a DSAM system. Modulation, to include DCP-DSAM, can be produced by spatially selecting the elements that are excited as a function of time or selecting the starting point along the element as a function of time just as it was with the MSP.

By way of illustration and not as a limitation, the antenna structure comprises a ¼ turn resonant design due to desirable near −180 degree hemispherical omnidirectionality, axial ratio performance (CP purity), and the capability for more complex DCP design. In an embodiment, the feed electronics occupy printed circuit board (PCB) elements at the top and bottom of the QFH structure, providing partial support for the radiating elements and housing the active spatial modulation components. The transmitter and receiver prototypes, housed in individual enclosures, are connected to a prototype DSAM QFH antenna. In compatible mode, the DSAM properties of the QFH antennas are not used other than to place the structure in a fixed state. In full DSAM mode, including DCP-DSAM, only the modulating properties of the transmit antenna are used. Finally, in DSSS mode, both antennas are modulated, using for example, BPSK as well as other more complex formats and polarization states.

The embodiment illustrated in FIG. 2 represents but one of an entire family of possible instantiations of an antenna design based on the DSAM architecture. There are many ways to implement DSAM-based antenna structure and any particular implementation will reflect a balancing of secondary considerations such as size, cost, application, and the minutiae of electronic performance criteria known to one of ordinary skill in the art. In one embodiment, for example, a DSAM-based antenna structure takes advantage of higher-order spatial excitation. In another embodiment, DSAM-based antenna structure includes additional spatial antenna port excitation points with non-equal coupling or excitation efficiencies allowing for jointly implemented space-time-amplitude symbol mapping. In yet another embodiment, a DSAM-based antenna structure supports QPSK modulation in a compatible fashion with existing QPSK waveforms while enjoying the DSAM benefits of reduced cost and complexity. In another example, a quadrifilar helix-based structure could support omni-directional DCP-DSAM waveforms.

In an embodiment, a DSAM-based antenna structure is used for signal demodulation.

By way of illustration and not as a limitation, in an embodiment, a DSAM compliant antenna structure may be used in direct-sequence spread spectrum (DSSS) links. In this embodiment, both code and polarization phase are required for proper demodulation of a received signal with DSAM. This requirement for proper synchronization between two aspects of the received signal for full de-spreading in DSAM adds a level of separation between the intended received signal and other users or jammers not present in non-DSAM approaches. Secondly, the DSAM concept allows for receiver architectures that can perform demodulation prior to the signal being processed in any active devices in the receiver. The demodulation of signals in a DSAM architecture thereby avoids a whole host of linearity issues associated with active devices such as low noise amplifiers and mixers that are necessarily present in a typical receive chain. Since DSAM can uniquely provide interference signal suppression in a receiver without the use of active components to include co-channel interferers, it affords an aspect of interference rejection not available through any other known means.

The polarization accuracy of a DSAM antenna device is dominated by the polarization accuracy available from the type of antenna to which the DSAM concept is applied. As such there are only a few applicable general statements that can be made:

Essentially all well-developed antenna structures from which a DSAM implementation can draw have spatially-distributed power patterns that correspond directly to their polarization patterns.

The degree of polarization "purity" that an antenna can achieve potentially impacts the net error performance of a DSAM signal, which is not necessarily the case for traditional modulation.

The first statement indicates that most antennas have little signal strength response at the same point that polarization accuracy begins to break down. When analyzing the extrema of a physical communications link scenario, the breakdown in polarization accuracy on the fringes of the power pattern is essentially moot, since there is no signal originating from that spatial direction to process in the first place.

On the other hand, system configurations where less than an optimal spatial response is acceptable or expected would suffer from some degree of modulation accuracy degradation, the degree of which depends on the entirety of the system configuration. This alternate view could be a benefit from the standpoint of interference rejection of adjacent spatial user groups, or a potential drawback due to reduction of effective spatial pattern coverage.

The second statement brings to light the interplay between signal strength and polarization accuracy relative to received symbol error rate. For the typical approach of modeling a communications link as being limited by additive white Gaussian noise (AWGN), a sufficiently high polarization accuracy will result in a link dominated by received signal amplitude, as is the usual case. If instead the polarization accuracy of the DSAM antenna is low, then there will be a minimum error rate established that increasing signal strength cannot overcome. For the modulation format complexities anticipated for use with DSAM, the expected polarization accuracy that can be achieved in most reasonable antenna structures is such that the channel will remain dominated by received signal amplitude as it is with existing solutions, which validates the technology.

No loss of radiation efficiency is expected relative to the performance of the antenna structure itself when DSAM is applied to the structure. Additional nominal feed losses will be present, but the radiating portion of the structure itself will remain unchanged. The theoretical radiation efficiency of a DSAM antenna depends on the basic antenna architecture itself, and as such the existing theory available for any antenna targeted for a DSAM implementation can be consulted.

Theoretical error rate equations were derived for DSAM as a function of phase and amplitude errors in a modulating antenna structure. The results indicate that errors in antenna accuracy correspond on a 1:1 basis as a reduction in mean symbol constellation point energy with a corresponding equivalent reduction in mean symbol signal to noise ratio (SNR).

As with radiation efficiency, application of DSAM will have no impact on the power handling of the antenna architecture in use, in and of itself. The power handling limits of PIN diode spatial modulation control will be a matter of a specific DSAM unit design. In general, the RF carrier will be too high in frequency for the PIN diode to respond as it does to a modulating signal.

Controlling the time-domain symbol pulse shaping waveform g(t) is one of the two means available to control the form and extent of a modulated signal's average power spectral density (PSD). The other way to affect a digitally modulated signal's PSD is to control the actual information sequence $I_n$.

Both g(t) and $I_n$ can be used with DSAM. With respect to g(t), the simplest assumption is of "very fast" switching response in the composite DSAM structure, which is equivalent to the case of a rectangular g(t). A rectangular g(t) essentially means that there is no pulse shaping at all, so using DSAM to produce modulation has no specific pulse shaping effect under this assumption.

DSAM implementations that produce a rectangular g(t) are the most readily comparable to classical theoretical results. Such designs may also produce more out of band spectral sidelobe power than typically applied g(t) waveforms. Out of band emissions limit the number of users that can occupy a fixed portion of the shared spectrum simultaneously, so layering this traditional approach to band-limiting on DSAM will be expected eventually by the design community, especially when the more significant 50% efficiency of DCP QPSK DSAM is demonstrated.

Laboratory verification with DSAM MSP prototype has verified the spectral occupancy of DCP QPSK DSAM at data rates in excess of 1 Mbps.

Implementing a specific g(t) such as a popular root-raised-cosine or Gaussian shape in a DSAM implementation requires design and analysis that accounts for the interplay between the antenna structure, the guided feed network, and the multiple spatial ports of the structure in the presence of the changing PIN port loads.

In an embodiment, achieving a particular g(t) with a DSAM implementation utilizes an iterative approach using a time-domain numerical solver.

In cases where DSAM is otherwise indistinguishable from standard BPSK or QPSK, detection sensitivity relative to the AWGN limit is also identical. The conditions for mathematical equivalence of DSAM QPSK and regular QPSK were discussed previously.

In an embodiment, DCP QPSK DSAM is achieved using a new receiver architecture that incorporates polarization sense detection. The most basic implementation of this embodiment involves the use of two QPSK receiver chains, one fed a RHCP-matched input and the other fed an LHCP-matched input.

DSAM processing gain applies to the demodulation mode. In an embodiment, a demodulator configuration utilizes DSAM processing similar to that used in direct sequence spread spectrum (DSSS) applications for the case of BPSK modulation, except that the processing gain will be achieved prior to any active receive electronics. Processing gain will be proportional to the quotient of the occupied bandwidth of the desired signal when it is spread to the bandwidth that it occupies once it is de-spread.

In an embodiment, the PIN diode switches are operated with bi-polar bias states. PIN diode switching characteristics are non-symmetric with respect to forward and reverse bias activation times unless special care is taken. In general, bi-polar bias states, as opposed to only forward bias and ground/zero bias states, will yield the most symmetric diode switching times and ideal impedance states.

In an embodiment using a symmetric square MSP antenna structures, the cross-polar (0,2) mode is suppressed. For a square MSP patch antenna with a primary resonant mode of operation (1,0) describing the π/2 cosinusoidal electric field basis order along the (longitudinal, perpendicular) extent of the patch structure, the second-order orthogonal (0,2) mode contributes the most to the cross-polar response of the structure and should be suppressed. Suppression of the cross-polar response is useful in preserving the polarization purity of the DSAM response. In one embodiment, suppression is achieved by the introduction of a center shorting post in the geometric center of the path element.

In an embodiment, a DSAM utilizes a half wavelength (λ/2) MSP with edge fed excitation ports. Each excitation port is inset relative to the geometric center of the MSP to achieve a port impedance close to 100Ω. Most RF and microwave systems work with a characteristic impedance ($Z_0$) of 50Ω, which is still the case for this prototype relative to the primary carrier excitation port. In full DCP operation, two ports load the carrier input in parallel simultaneously, presenting an equivalent 50Ω load.

By design, the PIN diode shunt reflective switch network features the ability to feed any given antenna port at a relative 0° phase state alone, and possibly simultaneously feed any adjacent port at a relative 270° phase state with the same amplitude. If only a single 0° port is excited for a given information symbol state, then the antenna will produce dual-linear polarized QPSK DSAM. If both the 0° state and an adjacent 270° state (which is the same as a −90° state) are excited during a symbol period, then the antenna will produce CP QPSK DSAM, so long as the same "clock sense" adjacency is adhered to among all symbol states. Otherwise, DCP QPSK DSAM will result. Finally, if only one port or pair of phase-conjugate adjacent ports is excited, then the antenna will behave as a normal MSP of appropriate linear or circular polarization, respectively.

In an embodiment, an antenna utilizes 4-layer FR-4 PCB construction with 0.062" dielectric thickness. The board vias are plated, and are 0.020" in diameter. The RF PIN diodes used are the BAP-051 in an SOD-323 surface-mount package. Capacitors are NP0 type 0603 size, inductors are ceramic type 0603 size, and resistors are thin film type with 0603 package size as well. Each active PIN diode is biased at approximately 1 mA in the forward direction and 0 V in the reverse direction. One diode is reversed biased to feed the 0° port, and an adjacent phase conjugate port is excited by reverse biasing two additional diodes. All diodes are in shunt configuration and are placed at λ/4 electrical length from source node locations. Each reverse biased diode appears as an open circuit and the associated network acts as a "through" connection. When forward biased, the low-impedance state of the PIN diode acts as a relative short circuit, which, when transformed through the λ/4 electrical length of the associated microstrip lines, acts as an open circuit from the perspective of the external network.

In an embodiment, a DSAM antenna is used to produce an omnidirectional signal. In one implementation an antenna structure is a quadrifilar helix (QFH). QFH antennas are widely used in GPS and satellite applications, and a QFH can be constructed to produce an omni-directional pattern that features excellent CP response throughout the pattern.

In an embodiment, the modulation port switching circuit provides an input to the DSAM that is rectangular. In another embodiment, the input signal is "shaped" prior to being applied to the antenna.

In an embodiment, a DSAM is implemented to provide wideband communications. In this application, DSAM antennas enable cost, size, and efficiency improvements over state of the art traditional antenna-based systems. With current waveforms (e.g. BPSK, QPSK, F-QPSK) DSAM reduces the complexity and cost of RF front ends. Example markets include aerospace telemetry, wideband terrestrial and satellite communications, cellular communications, land-mobile radio, and wireless LAN/WAN.

In another embodiment, a DSAM is implemented to provide interference rejection and/or anti-jamming capabilities. Strong co-channel interference can saturate RF front end Low Noise Amplifiers (LNAs), preventing signals from being decoded. As a DSAM can de-spread a signal prior to an LNA, overload is mitigated, and small signals can be processed in the presence of strong jammers. Furthermore, DSAM antennas can enhance interference rejection by enabling spread-spectrum as simple drop-in components in existing and legacy communications systems. That is, any signal, modulated or not, that is passed to a DSAM antenna can be spread in phase and polarization, to be reconstructed by another drop-in DSAM antenna on the other end of the link. Example markets include defense communications, RF Measurement and Signature Intelligence (MASINT) systems, and industrial telemetry.

In an embodiment, a DSAM is implemented as an omni-directional implementation to support situations where transmitting and receiving antennas do not preserve specific geometric relationships. This is an advantage in most of the markets listed above. Additionally, this embodiment may be implemented in three modes.

A compatible mode utilizes a DSAM antenna that is compatible with existing technologies such as BPSK and QPSK, as well as pulse shaped variants. This DSAM antenna can operate on both or just one end of a communications link. A compatible DSAM can be "dropped in" with existing technologies for both TX and RX function, but with benefits in reduced cost/size/power.

A bandwidth-efficient mode utilizes a DSAM antenna that is capable of DCP-QPSK. This antenna provides up to 50% increased bandwidth efficiency over the state of the art in DCP mode, yet can operate in backwards compatible modes with existing technologies such as QPSK and BPSK. The other DSAM benefits are still applicable, such as cost and power.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A direct spatial antenna modulation (DSAM) system comprising:
    a radiating structure comprising a plurality of spatial points of origination, wherein a unique data symbol is associated with one or more of the plurality of spatial points of origination;
    a common feed point for receiving an excitation signal; and
    a switching system responsive to a baseband data signal, wherein in response to the presence of the unique data symbol in the baseband data signal, the switching system directs the excitation signal to the one or more spatial points of origination associated with the particular unique data symbol, and wherein the one or more spatial points of origination associated with the unique data symbol determine a characteristic of a signal emitted by the radiating structure.

2. The DSAM system of claim 1, wherein the excitation signal is an unmodulated carrier.

3. The DSAM system of claim 1 wherein the signal emitted by the radiating structure comprises characteristics of a modulated signal selected from the group consisting of a quadrature phase shift keying (QPSK) signal, a binary phase shift keying (BPSK) signal, a dual circular polarized QPSK signal, a linearly polarized signal and a circularly polarized signal.

4. The DSAM system of claim 3, wherein the circular polarization is selected from the group consisting of left hand circular polarization and right hand circular polarization.

5. The DSAM system of claim 1, wherein the antenna structure comprises a square microstrip patch antenna further comprising:
    a ground layer;
    a top layer, wherein the top layer is situated above the ground layer and separated therefrom by a first dielectric layer and wherein the top layer comprises:
        feed ports located opposite of a mid-point of each side of the square microstrip patch antenna, wherein each feed port establishes a signal path to a spatial point of origination;
        top layer switching system elements at each corner; and
        top layer transmission lines, wherein the top layer transmission lines are situated parallel to the edges of the top layer and connect the top layer switching elements in response to the digital data signal; and a bottom layer, wherein the bottom layer is situated below the ground layer and is separated therefrom by a second dielectric layer, and wherein the bottom layer comprises:
- bottom layer switching system elements each associated with a single feed port; and
- bottom layer transmission lines, wherein the bottom layer transmission lines connect a first side of a bottom layer switching element to the common feed point and a second side of the bottom layer switching element to the single feed port associated with the bottom layer switching element in response to the digital data signal, wherein, the top layer transmission lines, top layer switching elements, bottom layer transmission lines and bottom layer switching elements are configured so as to cause the square microstrip patch antenna to provide an odd multiple of ¼ guided wavelength electrical delay over the desired operating band of the device with respect to the common feed location, spatial points of origination, and switching system elements.

6. The DSAM system of claim 1, wherein the switching system comprises a switching RF PIN diode.

7. The DSAM system of claim 1, wherein the excitation signal is an unmodulated carrier and wherein the unique data symbol is associated with at least two spatial points of origination, and wherein in response to the presence of the unique data symbol in the baseband data signal, the switching system directs the unmodulated carrier signal to the at least two spatial points of origination associated with the unique data symbol.

8. The DSAM system of claim 7, wherein the radiating structure is excited by the unmodulated carrier signal at the at least two spatial points of origination.

9. A method for determining a characteristic of a signal using a radiating structure, wherein the radiating structure comprises a plurality of spatial points of origination, a switching system and a common feed point, the method comprising:
- associating a unique data symbol with one or more of the plurality of spatial points of origination;
- directing an excitation carrier signal to the common feed point; and
- applying a baseband data signal to the switching system, wherein in response to the presence of the unique data symbol in the baseband data signal, the switching system directs the excitation signal to the one or more spatial points of origination associated with the particular unique data symbol and wherein the one or more spatial points of origination associated with the unique data symbol determine a characteristic of a signal emitted by the radiating structure.

10. The method of claim 9, wherein the excitation signal is an unmodulated carrier.

11. The method of claim 9, wherein the signal emitted by the radiating structure comprises characteristics of a modulated signal selected from the group consisting of a quadrature phase shift keying (QPSK) signal, a binary phase shift keying (BPSK) signal, a dual circular polarized QPSK signal, a linearly polarized signal, and a circularly polarized signal.

12. The method of claim 11, wherein the circular polarization is selected from the group consisting of left hand circular polarization and right hand circular polarization.

13. The method of claim 9, wherein the switching system comprises a switching RF PIN diode.

14. The method of claim 9, wherein the excitation signal is an unmodulated carrier and wherein the unique data symbol is associated with at least two spatial points of origination, and wherein applying a baseband data signal comprising the unique data symbol to the switching system comprises applying the baseband data signal comprising the unique data symbol to the switching system to direct the unmodulated carrier signal to the at least two spatial points of origination associated with the unique data symbol.

15. The method of claim 14, wherein the radiating structure is excited by the unmodulated carrier signal in the at least two spatial points of origination.

* * * * *